United States Patent [19]

Schunck et al.

[11] Patent Number: 5,461,691
[45] Date of Patent: Oct. 24, 1995

[54] LIQUID, RADIATION-CURABLE COATING COMPOSITION FOR COATING GLASS SURFACES

[75] Inventors: Stephan Schunck, Augsburg; Horst Hintze-Brüning, Münster; Rainer Blum, Ludwigshafen, all of Germany

[73] Assignee: BASF Lacke + Farben AG, Muenster-Hiltrup, Germany

[21] Appl. No.: 244,432

[22] PCT Filed: Nov. 24, 1992

[86] PCT No.: PCT/EP92/02699

§ 371 Date: May 26, 1994

§ 102(e) Date: May 26, 1994

[87] PCT Pub. No.: WO93/11080

PCT Pub. Date: Jun. 10, 1993

[30] Foreign Application Priority Data

Nov. 28, 1991 [DE] Germany ............. 41 39 127.6

[51] Int. Cl.$^6$ .............. G02B 6/00; B05D 3/06; C08F 2/50; C08F 2/54
[52] U.S. Cl. .......... 385/123; 427/503; 427/515; 428/391; 428/447; 522/18; 522/96; 522/172
[58] Field of Search .............. 522/96, 172, 18; 428/391, 478, 447; 385/145, 123; 427/503, 515

[56] References Cited

U.S. PATENT DOCUMENTS

| | | | |
|---|---|---|---|
| 3,715,371 | 2/1973 | Thomson | 260/359 |
| 4,002,651 | 1/1977 | Marsden et al. | 260/349 |
| 4,038,456 | 7/1977 | Marsden et al. | 428/391 |
| 4,401,598 | 8/1983 | Karl et al. | 206/349 |
| 4,447,495 | 5/1984 | Engle, III | 428/429 |
| 4,812,519 | 3/1989 | Gillette | 525/106 |
| 5,252,403 | 10/1993 | Blum et al. | 428/447 |
| 5,286,527 | 2/1994 | Blum et al. | 427/407.1 |
| 5,302,458 | 4/1994 | Blum et al. | 428/429 |

FOREIGN PATENT DOCUMENTS

| | | | |
|---|---|---|---|
| 0119011 | 9/1984 | European Pat. Off. | C03C 25/02 |
| 0304837 | 3/1989 | European Pat. Off. | C03C 25/02 |
| 3012346 | 1/1991 | Japan. | |
| WO90/06289 | 6/1990 | WIPO. | |
| WO90/13523 | 11/1990 | WIPO. | |

Primary Examiner—Susan W. Berman
Attorney, Agent, or Firm—Anne Gerry Sabourin

[57] ABSTRACT

The present invention is directed to a beam-curable coating composition for coating glass surfaces, particularly, optical glass fibers. The resultant coatings show slight or no loss of adhesion after exposure to moisture. The coating composition includes ethylenically unsaturated polyurethane, ethylenically unsaturated monomer, photoinitiator and a silane compound. The silane compound is an azidosilane and is added to improve adhesion of the coating agents exposed to moisture. Optionally, aminoalkoxysilanes may also be included.

18 Claims, No Drawings

LIQUID, RADIATION-CURABLE COATING COMPOSITION FOR COATING GLASS SURFACES

The present invention relates to a liquid, beam-curable coating composition for coating glass surfaces, comprising A) 56 to 89% by weight, based on the coating composition, of at least one ethylenically unsaturated polyurethane which optionally contains urea groups, B) 10 to 30% by weight, based on the coating composition, of at least one ethylenically unsaturated monomer, C) 0.5 to 8% by weight, based on the coating composition, of at least one photoinitiator and D) 0.05 to 6% by weight, based on the coating composition, of a silane, the sum of components (A) to (D) in each case being by weight.

The present invention furthermore relates to a process for coating glass surfaces, in particular optical glass fibers, using these beam-curable coating compositions.

Optical glass fibers have acquired a constantly increasing importance as light wave conductor fibers in the field of communications. For this intended use, it is absolutely essential to protect the glass surface from moisture and wear phenomena. The glass fibers are therefore provided with a protective coat of varnish directly after their production.

It is thus known, for example from EP-B-114,982, first to provide glass fibers with a buffer coat (primer) which is elastic but not very hard and not very tough, and then to apply a beam-curable top coating which has a high hardness and toughness. The two-coat build-up should guarantee good protection of the glass fibers under mechanical stress, even at low temperatures. Beam-curable coating compositions based on a polyurethane containing diethylenic end groups, a diethylenically saturated ester of a diglycidyl ether of a bisphenol, and a monoethylenically unsaturated monomer, the glass transition temperature of the homopolymer prepared from this monomer being above 55° C., are employed as the top coating in EP-B-114,982.

However, such glass fiber coatings have the considerable disadvantage of only poor adhesion to the glass surface. This adhesion is worsened still further under exposure to moisture in particular, and under certain circumstances even to the extent that complete loss of adhesion to the glass surface occurs. The problem of poor adhesion of coating compositions to the surface of glass is known. Organosilanes are therefore often added to the coating compositions as adhesion promoters in order to improve the adhesion.

Liquid, beam-curable glass fiber coating agents which, in addition to a beam-curable polyethylenically unsaturated polymeric compound, comprise 0.5 to 5%, based on the coating composition, of a polyalkoxysilane are known from EP-A-149,741. Those polyalkoxysilanes which carry an organic substituent which carries a single active amino- or mercapto-hydrogen atom which can react with the ethylenically unsaturated bonds in a Michael addition are suitable. γ-Mercaptopropyltrimethoxysilane is mentioned as an example of suitable silanes. According to the doctrine of EP-A-149,741, it is possible to improve adhesion even under exposure to moisture only by using such silanes.

Liquid, beam-curable glass fiber coating agents which comprise a diethylenically unsaturated polyurethane resin as the binder and ethylenically unsaturated monomers as reactive diluents furthermore are known from DE-OS 38 40 644. To improve the adhesion even under exposure to moisture, these glass fiber coating agents comprise 0.05 to 6% by weight of N-β-aminoethyl-γ-aminopropyltrimethoxysilane, γ-amino-propyltrimethoxysilane, N-methyl-γ-aminopropyltrimethoxysilane or triamino-modified propyltri-methoxysilane. However, these glass fiber coating agents are still in need of improvement in respect of production reliability.

Solutions based on polycondensates having N-containing heterocyclic ring systems which comprise azidosilanes as adhesion promoters furthermore are known from the not yet published German Patent Application P 4107664.8. However, the addition of azidosilanes to beam-curable coating compositions based on ethylenically unsaturated polyurethanes is not described.

Finally, it is known from the not yet published German Patent Application P 4113655.1 [lacuna] a mixture of azidosilanes and aminoalkoxysilanes as an adhesion promoter between inorganic substrates and polycondensates which contain, as structural units, heterocyclic ring systems having N atoms. The addition of these adhesion promoters to beam-curable coating compositions based on ethylenically unsaturated polyurethanes in turn is not described.

The present invention was therefore based on the object of providing beam-curable coating compositions for coating glass surfaces, in particular optical glass fibers, in which the resulting coating shows no loss, or only a slight loss, in adhesion after exposure to moisture, in comparison with the corresponding freshly produced coating investigated directly after curing. Furthermore, it should be possible to prepare the coating compositions with a high production reliability.

The object on which the invention is based is achieved, surprisingly, by a liquid, beam-curable coating composition for coating glass surfaces, which comprises A) 56 to 89% by weight, based on the coating composition, of at least one ethylenically unsaturated polyurethane which optionally contains urea groups, B) 10 to 30% by weight, based on the coating composition, of at least one ethylenically unsaturated monomer, C) 0.5 to 8% by weight, based on the coating composition, of at least one photoinitiator and D) 0.05 to 6% by weight, based on the coating composition, of a silane, the sum of components (A) to (D) in each case being 100% by weight.

The coating composition is characterized in that the component (D) employed is d₁) at least one azidosilane of the general formula (I)

wherein $R^1$ represents a $C_1$–$C_3$-alkyl or a phenyl, benzyl or toluyl group, $R^2$ represents a $C_1$–$C_4$-alkyl or $C_2$–$C_4$-alkoxyalkyl or a phenyl or benzyl group, $R^3$ represents a $C_1$–$C_8$-alkylene group, which can be interrupted by an oxygen atom or sulfur atom or a —(N—$R^4$)-group, wherein $R^4$ denotes a hydrogen or a methyl, ethyl or phenyl group, and n represents 0, 1 or 2, and d2) if appropriate at least one aminoalkoxysilane of the formula (II)

wherein $R^5$ represents a $C_1$–$C_6$-alkylene or a $C_5$–$C_6$-cycloalkylene or -arylene group, which can additionally be substituted by one or two $C_1$–$C_3$-alkyl groups, and $R^6$ and $R^7$ independently of one another represent a $C_1$–$C_6$-alkyl or a $C_5$–$C_6$-cycloalkyl group, which can likewise additionally be substituted by one or two $C_1$–$C_3$-alkyl groups, and m can be 0, 1 or 2.

In view of the large number of organosilicon compounds known as adhesion promoters, it was surprising and unforeseeable that, by using azidosilanes, if appropriate in combination with aminoalkoxysilanes, the adhesion of the coating agents after exposure to moisture is improved significantly in comparison with the known coating agents which comprise, for example, N-β-aminoethyl-γ-aminopropyltrimethoxysilane as an adhesion promoter, whereas when other known adhesion promoters, such as, for example, γ-glycidyloxypropyltrimethoxysilane and the monohydrochloride of N-β-(N-vinylbenzylamino)-ethyl-γ-aminopropyltrimethoxysilane, are used, a considerable deterioration in adhesion occurs on exposure to moisture.

The coating composition according to the invention will now be explained in more detail below:

The ethylenically unsaturated polyurethanes (A) employed as the film-forming component can be obtained by reaction of a di- or polyisocyanate with a chain-lengthening agent from the group comprising diols/polyols and/or diamines/polyamines and/or dithiols/polythiols and/or alkanolamines, and subsequent reaction of the residual free isocyanate groups with at least one hydroxyalkylacrylate (sic) of other ethylenically unsaturated carboxylic acids.

The amounts of chain-lengthening agent, di- or polyisocyanate and hydroxylalkyl ester of an ethylenically unsaturated carboxylic acid are chosen here such that 1) the ratio of the equivalents of NCO groups to reactive groups of the chain-lengthening agent (hydroxyl, amino or mercaptyl groups) is between 3:1 and 1:2, and is preferably 2:1, and 2) the OH groups of the hydroxyalkyl esters of the ethylenically unsaturated carboxylic acids are present in a stoichiometric amount with respect to the isocyanate groups which are still free in the prepolymer of isocyanate and chain-lengthening agent.

It is moreover possible to prepare the polyurethanes (A) by first reacting some of the isocyanate groups of a di- or polyisocyanate with at least one hydroxyalkyl ester of an ethylenically unsaturated carboxylic acid and then reacting the residual isocyanate groups with a chain-lengthening agent. In this case also, the amounts of chain-lengthening agent, isocyanate and hydroxyalkyl esters of unsaturated carboxylic acids are chosen such that the ratio of the equivalents of NCO groups to reactive groups of the chain-lengthening agent is between 3:1 and 1:2, and is preferably 2:1, and the ratio of the equivalents of residual NCO groups to OH groups of the hydroxyalkyl ester is 1:1.

All the intermediate forms of these two processes are of course also possible. For example, some of the isocyanate groups of a diisocyanate can first be reacted with a diol, a further portion of the isocyanate groups can then be reacted with the hydroxyalkyl ester of an ethylenically unsaturated carboxylic acid, and thereafter the residual isocyanate groups can be reacted with a diamine.

These various preparation processes for polyurethanes are known (compare, for example, EP-A-204,161) and therefore require no more detailed description.

Isocyanates which are suitable for the preparation of the polyurethanes (A) are aromatic, aliphatic and cycloaliphatic di- and polyisocyanates, such as, for example, toluylene 2,4- and 2,6-diisocyanate and mixtures thereof, diphenylmethane 4,4'-diisocyanate, m-phenylene diisocyanate, p-phenylene diisocyanate, diphenyl 4,4'-diisocyanate, naphthalene 1,5-diisocyanate, naphthalene 1,4-diisocyanate, toluidine 4,4'-diisocyanate and xylylene diisocyanate, as well as substituted aromatic systems, such as, for example, dianisidine diisocyanates, diphenylether 4,4'-diisocyanates or chlorodiphenylene diisocyanates, and aromatic isocyanates of higher functionality, such as, for example, 1,3,5-triisocyanatobenzene, 4,4'-,4"-triisocyanatotriphenylmethane (sic), 2,4,6-triisocyanatotoluene and 4,4'-diphenyldimethylmethane 2,2',5,5'-tetraisocyanate; cycloaliphatic isocyanates, such as, for example, cyclopentane 1,3-diisocyanate, cyclohexane 1,4-diisocyanate, cyclohexane 1,2-diisocyanate, 4,4'-methylene-bis-(cyclohexyl isocyanate) and isophorone diisocyanate; aliphatic isocyanates, such as, for example, trimethylene, tetramethylene, pentamethylene, hexamethylene and trimethylhexamethylene 1,6-diisocyanate and tris-hexamethylene triisocyanate, and the diisocyanates which are derived from dimeric fatty acids and are described in EP-A-204,161, column 4, lines 42 to 49.

Toluylene 2,4- and 2,6-diisocyanate, diphenylmethane 4-4'-diisocyanate (sic), hexamethylene diisocyanate, isophorone diisocyanate and 4,4'-methylene-bis-(cyclohexyl isocyanate) are preferably employed.

Examples of suitable di- and polyols are, for example, ethylene glycol, propylene 1,2- and 1,3-glycol, butane diols, pentane diols, neopentyl glycol, hexane diols, 2-methylpentane-1,5-diol, 2-ethylbutane-1,4-diol, dimethylolcyclohexane, glycerol, trimethylolethane, trimethylolpropane and trimethylolbutane, erythritol, mesoerythritol, arabitol, adonitol, xylitol, mannitol, sorbitol, dulcitol, hexanetriol and (poly)-pentaerythritol; and furthermore monoethers, such as diethylene glycol and dipropylene glycol, as well as polyethers and the adducts of the polyols mentioned and alkylene oxides. Examples of alkylene oxides which are suitable for polyaddition onto these polyols to form polyethers are ethyleneoxide, propyleneoxide, butyleneoxide and styreneoxide. These polyaddition products are in general called polyethers having terminal hydroxyl groups. They can be linear or branched. Examples of such polyethers are polyoxyethylene glycols having a molecular weight of 200 to 4000, polyoxypropylene glycols having a molecular weight of 200 to 4000, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can likewise be used. Suitable polyether-polyols are also those which are obtained by reaction of such polyols, such as ethylene glycol, diethylene glycol, triethylene glycol, 1,4-butanediol, 1,3-butanediol, 1,6-hexanediol and mixtures thereof; glycerol trimethylolethane, trimethylolpropane, 1,2,6-hexanetriol, dipentaerythritol, tripentaerythritol, polypentaerythritol, methylglucosides and sucrose, with alkylene oxides, such as ethylene oxide, propylene oxide or mixtures thereof.

Examples of suitable polyether-diols are also the polymerization products of tetrahydrofuran or butylene oxide. Polyester-polyols, preferably polyester-diols, which can be prepared for example, by reaction of the glycols already mentioned with dicarboxylic acids, such as, for example, phthalic acid, isophthalic acid, hexahydrophthalic acid, adipic acid, azelaic, sebazic, maleic, glutaric and tetrachlorophthalic acid and hexachloroheptane dicarboxylic acid, furthermore can also be employed.

Instead of these acids, it is also possible to use their anhydrides, where these exist.

Polycaprolactone-diols and -triols can also be employed. These products are obtained, for example, by reaction of an ε-caprolactone with a diol. Such products are described in U.S. Pat. No. 3,169,945.

The polylactone-polyols which are obtained by this reaction are distinguished by the presence of a terminal hydroxyl group and by recurring polyester units which are derived from the lactone. These recurring molecular units can correspond to the formula

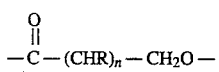

in which n is preferably 4 to 6 and the substituent is hydrogen, an alkyl radical, a cycloalkyl radical or an alkoxy radical, no substituent containing more than 12 carbon atoms and the total number of carbon atoms in the substituents in the lactone ring not exceeding 12.

The lactone used as the starting material can be any desired lactone or any desired combination of lactones, and this lactone should contain at least 6 carbon atoms in the ring, for example 6 to 8 carbon atoms, and at least two hydrogen substituents should be present on the carbon atom bonded to the oxygen group of the ring. The lactone used as the starting material can be represented by the following general formula.

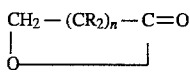

in which n and R have the meaning already given. The lactones preferred in the invention for the preparation of the polyester-diols are the caprolactones, in which n has the value 4. The most preferred lactone is substituted ε-caprolactone, in which n has the value 4 and all the R substituents are hydrogen. This lactone is particularly preferred, since it is available in large amounts and produces coatings which have excellent properties. Various other lactones furthermore can be used, individually or in combination.

Examples of aliphatic diols which are suitable for the reaction with the lactone are the diols already listed above for the reaction with the carboxylic acids.

Examples of suitable amines are ethylenediamine, tri-, tetra-, penta-, hexa-, hepta-, nona-, deca- and dodecamethylenediamine, 2,2,4 and 2,4,4-trimethylhexamethylenediamine, propylenediamine and the corresponding polyalkylenediamines, such as, for example, polypropylenediamine, polyether-diamines having a molecular weight of 200 to 4000, for example polyoxyethylenediamine, polyoxypropylenediamine and polyoxytetramethylenediamine, 1,3- and 1,4-butylenediamine, isophoronediamine, 1,2- and 1,4-diaminocyclohexane, 4,4'-diaminodicyclohexylmethane, bis-(3-methyl-4-aminocyclohexyl-)methane, 2,2-bis(4-aminocyclohexyl-)propane, 4,7-dioxadecane-1,10-diamine, 4,9-dioxadodecane-1,12-diamine, 7-methyl-4,10-dioxatridecane- 1,13-diamine, nitrilotris-(ethanamine), ethanolamine, propanolamine, N-(2-aminoethyl)ethanol, polyetherpolyamines, bis-(3-aminopropyl-)methylamine, 3-amino-1-(methylamino-)propane, 3-amino-1-(cyclohexyl-amino-)propane, N-(2hydroxyethyl-)ethylenediamine, tris-(2-aminoethyl-)amine and polyamines of the formula $H_2N-(R_2-NH)_nR_1-NH_2$. n is an integer between 1 and 6, preferably 1–3. $R_1$ and $R_2$ are identical or different alkylene groups or cycloalkylene groups, or alkylene groups containing ether groups, having 2–6, preferably 2–4, C atoms. Examples of such polyalkylenepolyamines are diethylenetriamine, triethylenetetraamine, tetraethylenepentaamine, dipropylenetriamine, tripropylenetetraamine, tetrapropylenepentaamine and dibutylenetriamine.

Di- and polythiols, such as, for example, dithioethylene glycol, 1,2- and 1,3-propanedithiol, butanedithiols, pentanedithiols, hexanedithiols and the other S-H analogous compounds of the di- and polyols mentioned, can also be employed as chain-lengthening agents.

Compounds which are suitable for introducing the ethylenically unsaturated groups into the polyurethane are hydroxyalkyl esters of ethylenically unsaturated carboxylic acids, such as, for example, hydroxyethyl acrylate, hydroxypropyl acrylate, hydroxybutyl acrylate, hydroxyamyl acrylate, hydroxyhexyl acrylate, hydroxyoctyl acrylate and the corresponding hydroxyalkyl esters of methacrylic, fumaric, maleic, itaconic, crotonic and isocrotonic acid.

The unsaturated polyurethanes described in EP-A-223, 086 furthermore are also suitable for use as component A in the coating agents according to the invention.

The beam-curable oligomers having several ethylenically unsaturated end groups and several urethane and/or urea groups per molecule which are described in previously unpublished German Patent Application P 40 27 770.4 are also suitable for use as component A in the coating agents according to the invention. These oligomers can be prepared from a) at least one hydroxyl- and/or amino-functional compound having a functionality of between 3 and 4 and a number-average molecular weight of between 300 and 4000, b) at least one compound having 2 hydroxyl and/or amino groups per molecule and a number-average molecular weight of between 200 and 4000, c) at least one monoethylenically unsaturated compound having one group with an active hydrogen atom per molecule and a number-average molecular weight of between 116 and 1000 and d) at least one aliphatic and/or cycloaliphatic diisocyanate, components a to d being employed in amounts such that 1) the molar ratio of component a to component b is between 0.1:1 and 1.1:1, preferably between 0.1 and 0.8, 2) the molar ratio of component c to component a is between 2.0:1 and 10:1, preferably between 2.5 and 10, and 3) the ratio of the equivalents of the isocyanate groups of component d to hydroxyl and/or amino groups of the sum of components a to c is between 0.9 and 1.0.

Hydroxy- and/or amino- functional compounds having a functionality of 3 to 4, preferably 3, are suitable as component a for the preparation of the oligomers. These compounds have number-average molecular weights of 300 to 4000, preferably of 500 to 2000.

Examples of suitable compounds are polyoxyalkylated triols, such as, for example, ethoxylated and propoxylated triols, preferably ethoxylated triols, particularly preferably having a number-average molecular weight of greater than or equal to 1000. Glycerol or trimethylolpropane, for example, are employed as triols.

The corresponding amino-functional compounds, such as, for example, the amino-functional compounds derived from polyalkoxylated triols, are also suitable. Examples are the products obtainable under the name JEFFAMIN® from Texaco, for example JEFFAMIN® T 403, T 3000, T 5000, C 346, DU 700 and BuD 2000.

The amino-functional compounds here can contain both primary and secondary amino groups.

In addition, compounds which contain both amino and hydroxyl groups are also suitable.

Compounds which contain two hydroxyl and/or amino groups per molecule are suitable as component b. These compounds have number-average molecular weights of 200 to 4000, preferably 600 to 2000.

Examples of suitable compounds b are polyoxyalkylene glycols and polyoxyalkylenediamines, alkylene groups having 1 to 6 C atoms being preferred. Thus, for example, polyoxyethylene glycols having a number-average molecular-weight of 1000, 1500, 2000 or 2500, as well as polyoxypropylene glycols having the corresponding molecular weights and polytetramethylene glycols are suitable. Polyethoxylated and polypropoxylated diols can also be employed, such as, for example, the ethoxylated and propoxylated derivatives of butanediol, hexanediol and the like. The polyester-diols already described on page 11 of the present application furthermore can also be employed. The polycaprolactone-diols described on pages 12 to 13 of the present application furthermore can also be employed as component b.

The corresponding diamines and compounds having an OH and amino group can of course also be employed as component b. Examples of suitable compounds are the products obtainable under the name JEFFAMIN® D 230, D 400, D 2000, D 4000, ED 600, ED 900, ED 2001 and ED 4000 from Texaco.

A mixture of $b_1$) 0 to 90 mol % of at least one polyether-diol and $b_2$) 10 to 100 mol % of at least one modified polyether-diol from $b_{21}$) at least one polyether-diol, $b_{22}$) at least one aliphatic and/or cycloaliphatic dicarboxylic acid and $b_{23}$) at least one aliphatic, saturated compound having an epoxide group and 8 to 21 C atoms per molecule, the sum of the contents of components $b_1$ and $b_2$ of the contents of components $b_{21}$ to $b_{23}$ in each case being 100 mol %, is preferably employed as component b.

To prepare the modified polyether-diols by the customary methods, components $b_{21}$ to $b_{23}$ are employed in amounts such that the ratio of the equivalents of the OH groups of component $b_{21}$ to carboxyl groups of component $b_{22}$ is between 0.45 and 0.55, and is preferably 0.5, and that the ratio of the equivalents of epoxide groups of component $b_{23}$ to carboxyl groups of component $b_{22}$ is between 0.45 and 0.55, and is preferably 0.5.

Examples of suitable polyether-diols $b_1$ and $b_{21}$ are the polyoxyalkylene glycols already mentioned, the alkylene groups containing 1 to 6 C atoms. Polyoxypropylene glycols having a number-average molecular weight of between 600 and 2000 are preferably employed here as component $b_1$. Polyoxybutylene glycols (poly-THF) having a number-average molecular weight of >1000 are preferably employed as component $b_{21}$.

Aliphatic and cycloaliphatic dicarboxylic acids having 8 to 36 C atoms per molecule, such as, for example, hexahydrophthalic acid, are preferably employed as component $b_{22}$.

Epoxidized vinylcyclohexane compounds, epoxidized monoolefinically unsaturated fatty acids and/or polybutadienes, for example, are suitable as component $b_{23}$.

Glycidyl esters of branched monocarboxylic acids, such as, for example, the glycidyl ester of versatic acid, are preferably employed as component $b_{23}$.

Monoethylenically unsaturated compounds having a group with an active hydrogen atom and a number-average molecular weight of 116 to 1000, preferably 116 to 400, are employed to introduce the ethylenically unsaturated groups into the polyurethane oligomer. Examples which may be mentioned of suitable components c are, for example, hydroxyalkyl esters of ethylenically unsaturated carboxylic acids, such as, for example, hydroxyethyl acrylate, hydroxypropyl acrylate, hydroxybutyl acrylate, hydroxyamyl acrylate, hydroxyhexyl acrylate, hydroxyoctyl acrylate and the corresponding hydroxyalkyl esters of methacrylic, fumaric, maleic, itaconic, crotonic and isocrotonic acid, although the hydroxyalkyl esters of acrylic acid are preferred.

Adducts of caprolactone and one of the abovementioned hydroxyalkyl esters of ethylenically unsaturated carboxylic acids furthermore are suitable as component c. Adducts of the hydroxyalkyl esters of acrylic acid having a number-average molecular weight of 300 to 1000 are preferably employed.

Aliphatic and/or cycloaliphatic diisocyanates are suitable as component d for the preparation of the oligomers according to the invention.

Examples of suitable diisocyanates are the aliphatic and cycloaliphatic diisocyanates already mentioned on pages 8 and 9 of the present application. Isophorone diisocyanate and trimethylhexamethylene 1,6-diisocyanate are preferably employed.

The oligomers can be prepared in various ways. It is thus possible, for example, first to react the diisocyanate d with the chain-lengthening agents a and b and then to react the residual free isocyanate groups with the ethylenically unsaturated compound c.

It is furthermore possible to prepare the oligomers by first reacting some of the isocyanate groups of component d with the ethylenically unsaturated compound c and by then reacting the residual free isocyanate groups with the chain-lengthening agents a and b.

It is moreover possible to prepare the polyurethane oligomers by the process described in EP-A-223,086 on page 5.

Preferably, the polyurethane oligomers are prepared by means of a two-stage process by first carrying out the stoichiometric polyaddition of components a to d until more than 85% of the NCO groups of component d have reacted. In this first process step, components a to d are employed in amounts such that the ratio of the equivalents of NCO groups of component d to active hydrogen atoms of components a to c is 1:1.

In a second process step, the remainder of the other components (corresponding to the desired NCO:OH ratio) is then added, and the reaction is continued up to a conversion of the NCO groups of greater than 99%. Preferably, further component c is added in this second process step, and the desired NCO:OH equivalent ratio is established by addition of this component c.

These urethane oligomers usually have number-average molecular weights of 2500 to 10000, preferably 3000 to 6000 (measured by gel permeation chromatography against a polystyrene standard), weight-average molecular weights of 5000, 50,000, preferably 7000 to 0,000 (measured by gel permeation chromatography against a polystyrene standard), double bond contents of 0.5 to 1.5, preferably 0.6 to 0.9 mol/kg, and a functionality of >2 to 3.5, preferably 2.2 to 2.8, in each case per random average polymer molecule.

The unsaturated polyurethane (A) is employed in the coating compositions in an amount of 56 to 89% by weight, based on the coating composition.

In addition to the polyurethane (A) just described, the coating agent according to the invention also comprises 10 to 30% by weight, based on the coating composition, of at least one ethylenically unsaturated monomer (B). Examples of suitable monomers are ethoxyethoxyethyl acrylate, N-vinylpyrrolidone, phenoxyethyl acrylate, dimethylaminoethyl acrylate, hydroxyethyl acrylate, butoxyethyl acrylate, isobornyl acrylate, dimethylacrylamide and dicyclopentyl acrylate. Monomers which are moreover suitable are di- and polyacrylates, such as, for example, butanediol diacrylate, trimethylolpropane di- and triacrylate, pentaerythritol diacrylate and the long-chain linear diacrylates having a molecular weight of 400 to 4000, preferably 600 to 2500, which are described in EP-A-250,631. The two acrylate groups can be separated, for example, by a polyoxybutylene structure. 1,12-dodecyl diacrylate and the reaction product of 2 mol of acrylic acid with one mol of a dimeric fatty alcohol, which in general contains 36 C atoms, furthermore can be employed.

Mixtures of the monomers just described are also suitable. N-vinylpyrrolidone, phenoxyethyl acrylate, isobornyl acrylate and mixtures of these monomers are preferably employed.

The photoinitiator employed in the coating compositions according to the invention in an amount of 0.5 to 8% by weight, preferably 2 to 5% by weight, based on the coating composition, varies with the radiation employed for curing the coating agents (UV radiation, electron beam, visible light). The coating compositions according to the invention are preferably cured by means of UV radiation. In this case, ketone-based photoinitiators, for example acetophenone, benzophenone, diethoxyacetophenone, m-chloroacetophenone, propiophenone, benzoin, benzyl, benzyl dimethyl ketal, anthraquinone, thioxanthone and thixanthone (sic) derivatives, as well as mixtures of various photoinitiators, are usually employed.

If appropriate, various amines, for example diethylamine and triethanolamine, which act as synergists, can be employed in amounts of up to 4% by weight, based on the coating composition, together with the photoinitiators mentioned.

The coating compositions comprise, as a constituent which is essential to the invention, 0.05 to 6% by weight, preferably 1.2 to 2.2% by weight, based on the total weight of the coating composition, of $d_1$) at least one azidosilane of the general formula (I)

$$N_3-R^3-Si-R^1{}_n(OR^2)_{3-n} \qquad (I)$$

wherein $R^1$ represents a $C_1-C_3$-alkyl or a phenyl, benzyl or toluyl group, $R^2$ represents a $C_1-C_4$-alkyl or $C_2-C_4$-alkoxyalkyl or a phenyl 6r benzyl group, $R^3$ represents a $C_1-C_8$-alkylene group, which can be interrupted by an oxygen atom or sulfur atom or a $-(N-R^4)$-group, wherein $R^4$ denotes a hydrogen or a methyl, ethyl or phenyl group, and n represents 0, 1 or 2, and $d_2$) if appropriate at least one aminoalkoxysilane of the formula (II)

$$H_2N-R^5-Si-R^6{}_m(OR^7)_{3-m} \qquad (II)$$

wherein $R^5$ represents a $C_1-C_6$-alkylene or a $C_5-C_6$-cycloalkylene or -arylene group, which can additionally be substituted by one or two $C_1-C_3$-alkyl groups, and $R^6$ and $R^7$ independently of one another represent a $C_1-C_6$-alkyl or a $C_5-C_6$-cycloalkyl group, which can likewise additionally be substituted by one or two $C_1-C_3$-alkyl groups, and m can be 0, 1 or 2.

Azidosilanes of the formula (I) which are preferably employed are aliphatic azidosilanes, particularly preferably those in which $R_2$ represents a $C_1-C_4$-alkyl group, $R^3$ represents a $C_1-C_6$-alkylene group and n is 0. 3-azidopropyltriethoxysilane is especially preferred.

Mixtures of at least one azidosilane and at least one aminoalkoxysilane furthermore can also be employed in the coating compositions according to the invention, but azidosilanes are preferably employed by themselves. Particularly suitable aminoalkoxysilanes for combination with the azidosilanes are N-β-aminoethyl-γ-aminopropyltrimethoxysilane, γ-aminopropyltrimethoxysilane, N-methyl-γ-aminopropyltrimethoxysilane and/or triamino-modified propyltrimethoxysilane (for example the adhesion promoter DYNASYLAN®, "TRIAMO type", commercial product from Dynamit Nobel Chemie).

If mixtures are employed, the mixing ratio is usually between 0.05 and 4.0% by weight of azidosilane and 0.05 to 5.0% by weight of aminoalkoxysilane, preferably 0.2 to 1.1% by weight of azidosilane and 0.1 to 0.9% by weight of aminoalkoxysilane, based on the total weight of the coating composition.

If appropriate, the coating compositions according to the invention moreover can also comprise customary auxiliaries and additives in the customary amounts, preferably 0.05 to 10% by weight, based on the coating composition. Examples of such substances are levelling agents and plasticizers.

The coating compositions can be applied to the glass surface by means of known application methods, such as, for example, spraying, rolling, flooding, dipping, knife-coating or brushing.

The coating film is cured by means of radiation, preferably by means of UV radiation. The units and conditions for these curing methods are known from the literature (compare, for example, R. Holmes, U.V. and E.B. Curing Formulations for Printing Inks, Coatings and Paints, SITA Technology, Academic Press, London, United Kingdom 1984) and require no further description.

The present invention also relates to a process for coating a glass surface, in which I) a beam-curable coating composition which comprises
   A) 56 to 89% by weight, based on the coating composition, of at least one ethylenically unsaturated polyurethane which optionally contains urea groups,
   B) 10 to 30% by weight, based on the coating composition, of at least one ethylenically unsaturated monomer,
   C) 0.5 to 8% by weight, based on the coating composition, of at least one photoinitiator and
   D) 0.05 to 6% by weight, based on the coating composition, of a silane,
   the sum of components (A) to (D) in each case being 100% by weight, is applied and II) the coating composition is cured by means of UV radiation or electron beams.

The process is characterized in that the coating composition is employed (sic), as component (D), $d_1$) at least one azidosilane of the general formula (I)

$$N_3R^3-Si-R^1{}_n(OR^2)_{3-n} \qquad (I)$$

wherein $R^1$ represents a $C_1-C_3$-alkyl or a phenyl, benzyl or toluyl group, $R^2$ represents a $C_1-C_4$-alkyl or $C_2-C_4$-alkoxyalkyl or a phenyl or benzyl group, $R^3$ represents a $C_1-C_8$-alkylene group, which can be interrupted by an oxygen atom or sulfur atom or a $-(N-R^4)$group, wherein $R^4$ denotes a hydrogen or a methyl, ethyl or phenyl group, and n represents 0, 1 or 2, and $d_2$) if appropriate at least one aminoalkoxysilane of the formula (II)

$$H_2N-R^5-Si-R^6{}_m(OR^7)_{3-m} \qquad (II)$$

wherein $R^5$ represents a $C_1-C_6$-alkylene or a $C_5-C_6$-cycloalkylene or -arylene group, which can additionally be substituted by one or two $C_1-C_3$-alkyl groups, and $R^6$ and $R^7$ independently of one another represent a $C_1-C_6$-alkyl or a $C_5-C_6$-cycloalkyl group, which can likewise additionally be substituted by one or two $C_1-C_3$-alkyl groups, and m can be 0, 1 or 2.

For a more detailed description of the coating agent employed in the process according to the invention and of the procedure for this process, reference is made to pages 6 to 24 of this description.

The process according to the invention is particularly suitable for coating optical glass fibers. When the optical glass fibers are used as light wave conductors, in particular, it is important for the coating compositions applied for protection of the surface also to have a good adhesion to the glass fiber surface under exposure to moisture.

Losses in adhesion of the coating after exposure to moisture—which cannot be avoided when the glass fibers are used as light wave conductors (for example the glass fibers are open to the air at coupling stations)—lead to damage to the coating on the glass fiber surface. This then unprotected surface can now be damaged very easily, for example by grains of dust, which leads to a loss in optical properties. However, precisely by the process according to the invention or the coating compositions according to the invention, it is possible to avoid these disadvantages and to provide coatings having a very good adhesion, even after exposure to moisture.

The coating compositions according to the invention can be applied to the glass fiber here either in the form of a one-coat finish or as the primer of a two-coat finish. Suitable top coatings in the case of the two-coat finish are described, for example, in EP-B-114,982.

The invention is explained in more detail in the following examples. All the data on parts and percentages are weight data, unless expressly stated otherwise.

EXAMPLE 1

(comparison)

A beam-curable composition comprising 75.8 parts of unsaturated polyurethane, 9.2 parts of trimethylolpropane triacrylate, 12 parts of phenoxyethyl acrylate, 0.5 part of benzyl dimethyl ketal and 2.5 parts of benzophenone is prepared by known methods (compare, for example, EP-B-114 982) by first reacting 4 mol of 4,4'-methylene-bis-(cyclohexyl isocyanate) with 2 mol of polyoxypropylene glycol (molecular weight 1000) in the presence of trimethylolpropane triacrylate and phenoxyethyl acrylate. This resulting intermediate product is reacted with 2 mol of 2-hydroxyethyl acrylate and then with 1 mol of polyoxypropylenediamine (molecular weight 230). Thereafter, the photoinitiators are added to the mixture. Thoroughly cleaned (above all grease-free) glass plates (width×length=98×151 mm) are masked on the edge with Tesakrepp® adhesive tape No. 4432 (width 19 mm) and the coating composition is knife-coated on (dry film thickness 180 μm).

Curing is carried out with a UV irradiation unit fitted with two Hg medium pressure lamps each of 80 W/cm lamp output, at a belt speed of 40 m/minute in 2 passes operating under half load (=40 W/cm). The irradiated dose here is 0.08 J/cm² (measured with the UVICURE dosimeter, system EIT from Eltosch).

Immediately thereafter, the adhesion is tested as follows:

Carefully detach the start of the film somewhat from the glass using a blade.

Attach a wire loop to the detached part of the film with the aid of adhesive tape.

Hang on a spring balance and peel off at right angles at as far as possible a constant rate.

Read off the peel-off force required in g from the measurement scale.

The adhesion test is evaluated by taking the average of the values obtained from a duplicate determination and checking the reproducibility of good (=high) adhesion values by several repetitions.

The result of the adhesion test is shown in Table 1.

In addition to this adhesion test carried out, a floating roller peel test according to DIN 55 289 is also possible, but was not carried out.

To test the adhesion after exposure to moisture, the glass plates furthermore are stored, directly after curing, in suitable climatically controlled chambers at a defined atmospheric humidity of 90% relative atmospheric humidity (RH) (corresponding to DIN 50005) at room temperature (25° C.) for 24 hours.

Immediately after the end of the exposure, the peel-off test with the spring balance is carried out analogously to the adhesion test directly after irradiation.

The adhesion test is also evaluated in this case by obtaining the mean value from a duplicate determination. In the case of good (=high) adhesion values, at least two repeat measurements are carried out to check the reproducibility.

The result of this test is likewise shown in Table 1.

The test for adhesion to window glass carried out gives good, exclusive results as a laboratory method. This method is also carried out by the manufacturers of glass fibers, since it gives values which are close to those in practice and which give very good agreement with the adhesion values on optical glass fibers (typical thickness of the fibers 125 μm).

EXAMPLE 2

(comparison)

Analogously to Comparison Example 1, a beam-curable coating agent based on the unsaturated polyurethane is prepared. In contrast to Comparison Example 1, the coating agent additionally comprises 2% by weight, based on the total weight of the coating agent, of γ-glycidyloxypropyltrimethoxysilane.

Analogously to Comparison Example 1, this coating agent is applied to glass plates by means of a doctor knife (dry film thickness 180 μm) and cured with a mercury medium pressure lamp (dose output likewise 0.08 g/cm²). The adhesion of the coating is measured directly after curing of the coating agents and after storage at 90% relative atmospheric humidity at room temperature for 24 hours, as described in Comparison Example 1. The results are shown in Table 1.

EXAMPLES 3 and 4

(comparison)

Analogously to Example 2, glass coatings are produced, but with the difference that instead of 2% by weight, based on the total composition, of γ-glycidyloxypropyltrimethoxysilane, 2% by weight of 3-butenyltriethoxysilane (Example 3) or 2% by weight of the monohydrochloride of N-β-(N-vinylbenzylamino)ethyl-γ-aminopropyltrimethoxysilane

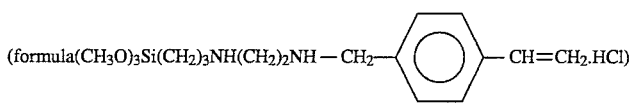

(formula $(CH_3O)_3Si(CH_2)_3NH(CH_2)_2NH-CH_2-C_6H_4-CH=CH_2 \cdot HCl$)

(Example 4), in each case based on the total weight of the coating agent, are now employed. The results of the adhesion test are shown in Table 1.

EXAMPLES 5–7

(comparison)

Analogously to Example 2, glass coatings are produced, but with the difference that instead of 2% by weight of γ-glycidyloxypropyltrimethoxysilane, 1 (Example 5) or 2 (Example 6) or 3 (Example 7) % by weight of N-β-aminoethyl-γ-aminopropyltrimethoxysilane, in each case based on the total weight of the coating agent, is now employed.

The results of the adhesion test are shown in Table 1.

EXAMPLES 8–10

Analogously to Example 2, glass coatings are produced, with the difference that instead of 2% by weight of γ-glycidyloxypropyltrimethoxysilane 1 (Example 8) or 2 (Example 9) or 3 (Example 10) % by weight of 3-azidopropyl-triethoxysilane, in each case based on the total weight of the coating agent, are now employed. The results of the adhesion test are shown in Table 1.

EXAMPLES 11–13

Analogously to Example 2, glass coatings are prepared, but with the difference that instead of 2% by weight of γ-glycidyloxypropyltrimethoxysilane, 0.5% by weight of 3-azidopropyltriethoxysilane and 0.5% by weight of N-β-amino-ethyl-γ-aminopropyltrimethoxysilane (Example 11) or 0.75% by weight of 3-azidopropyltriethoxysilane and 0.75% by weight of N-β-aminoethyl-γ-aminopropyltrimethoxysilane (Example 12) or 1.0% by weight of 3-azidopropyltriethoxysilane and 1.0% by weight of N-β-aminoethyl-γ-aminopropyltrimethoxysilane (Example 13), in each case based on the total weight of the coating agent, are now employed. The results of the adhesion test are shown in Table 1.

EXAMPLES 14–16

51.1 parts of polytetrahydrofuran having a number-average molecular weight of 1000 and an OH number of 118 mg of KOH/g and 19.1 parts of hexahydrophthalic anhydride are heated to 120° C. in a tank fitted with a stirrer, inert gas inlet and temperature probe, and are kept at this temperature until an acid number of 102 mg of KOH/g is reached. 0.02% of chromium octoate, based on the weight of the mixture of poly-THF, hexahydrophthalic acid and glycidyl ester of versatic acid, and 29.7 parts of the glycidyl ester of versatic acid having an epoxide equivalent weight of 266 are then added. The mixture is heated at 120° C. until the reaction product has an epoxide equivalent weight of >20,000, an acid number of 4 mg of KOH/g and an OH number of 60 mg of KOH/g.

The modified polyether-diol has an average molecular weight $M_n$ of 1860 (calculated from the OH number). The viscosity of an 80% strength solution in butylacetate is 3.8 d Pas (measured at 23° C. with a plate/cone viscometer).

0.35 mol of a commercially available, ethoxylated trimethylolpropane having a number-average molecular weight of 1000, 0.65 mol of commercially available polyoxypropylene glycol having a number-average molecular weight of 600, 0.65 mol of the modified polyether-diol described above, 1.75 mol of hydroxyethyl acrylate, 0.05% of dibutyltin dilaurate and 0.1% of 2,6-di-tert-butylcresol, in each case based on the total weight of the modified polyether-diol, the ethoxylated trimethylolpropane, the polyoxypropylene glycol, the hydroxyethyl acrylate and the isophorone diisocyanate, and 30 ppm of phenothiazine are initially introduced into a tank provided with a stirrer, feed devices, temperature probe and air inlet, and are heated to 60° C. 2.70 mol of isophorone diisocyanate are then metered in at 50° C. in the course of 2.5 hours. Thereafter, the mixture is diluted to a theoretical solids content of 90% with phenoxyethyl acrylate and the temperature is kept at 60° C. until an NCO value of 1% is reached. 0.05% of dibutyl tin dilaurate and 0.51 mol of a commercially available hydroxyethyl acrylate caprolactone oligomer having a number-average molecular weight of 344 (commercial product TONE M 100 from Union Carbide) are then added at a temperature of 80° C., and the temperature is kept at 80° C. until an NCO value of <0.1% is reached. The oligomer thus obtained has a double bond content of 0.6 mol/kg and a functionality of 2.5.

A 40% strength solution (based on the theoretical solids content) of the resulting oligomer 1 in phenoxyethyl acrylate has a viscosity of 4.9 dPas (measured at 23° C. with a plate/cone viscometer).

A beam-curable coating composition is prepared from 78.1 parts of the 90% strength solution, described above, of the urethane oligomer 1, 12.1 parts of phenoxyethyl acrylate, 6.2 parts of N-vinylpyrrolidone, 1% by weight of 3-azidopropyltriethoxysilane (Example 14) or 2% by weight of 3-azidopropyltriethoxysilane (Example 15) or 3% by weight of 3-azidopropyltriethoxysilane (Example 16) and 2.0 parts of diethoxyacetophenone by mixing.

Application and curing of the coating agents and testing of the resulting coatings are carried out analogously to Example 1.

The results of the adhesion test are shown in Table 2.

TABLE 1

| Example | Adhesion promoter D | Amount (D) (% by weight) | Adhesion after curing (kg) | Adhesion after 24h at 90% R.H. (kg) |
|---|---|---|---|---|
| 1 | — | — | 1000–1100 | 50–150 |
| 2 | γ-glycidyloxypropyltrimethoxysilane | 2 | 1000–1100 | 100–150 |
| 3 | 3-butenyltriethoxysilane | 2 | 900–1000 | 100–150 |
| 4 | monohydrochloride d.N-β-(N-vinylbenzylamino)ethyl- | 2 | 750–1000 | 50–100 |

TABLE 1-continued

| Example | Adhesion promoter D | Amount (D) (% by weight) | Adhesion after curing (kg) | Adhesion after 24h at 90% R.H. (kg) |
|---|---|---|---|---|
| | γ-aminopropyl-trimethoxysilane | | | |
| 5 | N-β-aminoethyl-γ-aminopropyltri-methoxysilane | 1 | 1000–1100 | 500 |
| 6 | N-β-aminoethyl-γ-aminopropyltri-methoxysilane | 2 | 1000–1100 | 500 |
| 7 | N-β-aminoethyl-γ-aminopropyltri-methoxysilane | 3 | 900–1000 | 450 |
| 8 | 3-azidopropyl-triethoxysilane | 1 | 1000–1200 | 550 |
| 9 | 3-azidopropyl-triethoxysilane | 2 | 1100–1300 | 650 |
| 10 | 3-azidopropyl-triethoxysilane | 3 | 1000–1200 | 600 |
| 11 | 3-azidopropyltri-ethoxysilane + N-β-aminoethyl-γ-aminopropyltri-methoxysilane | 0.5 0.5 | 950–1050 | 500 |
| 12 | 3-azidopropyltri-ethoxysilane + N-β-aminoethyl-γ-aminopropyltri-methoxysilane | 0.75 0.75 | 1000–1100 | 500 |
| 13 | 3-azidopropyltri-ethoxysilane + N-β-aminoethyl-γ-aminopropyltri-methoxysilane | 1.0 1.0 | 900–1000 | 450 |

TABLE 2

| Example | | Amount (D) (% by weight) | Adhesion after curing (kg) | Adhesion after 24h at 90% R.H. (kg) |
|---|---|---|---|---|
| 14 | 3-azidopropyltri-ethoxysilane | 1 | 900–1100 | 450 |
| 15 | 3-azidopropyltri-ethoxysilane | 2 | 1050–1150 | 550 |
| 16 | 3-azidopropyltri-ethoxysilane | 3 | 1000–1000 | 500 |

Examples 1 to 10 show that by addition of N-β-aminoethyl-γ-aminopropyltrimethoxysilane, the loss in adhesion after exposure to moisture can be reduced, while if other known silane adhesion promoters, such as, for example, γ-glycidyloxypropyltrimethoxysilane, 3-butenyltriethoxysilane and the monohydrochloride of N-β-(N-vinylbenzylamino)ethyl-γ-aminopropyltrimethoxysilane, are added, a considerable loss of adhesion on exposure to moisture is to be observed. By addition of 3-azidopropyltriethoxysilane, however, it is possible for the loss in adhesion after exposure to moisture to be reduced again significantly in comparison with addition of N-β-aminoethyl-γ-aminopropyltrimethoxysilane.

Furthermore, when the aminoalkoxysilanes are used as adhesion promoters, uncontrollable polymerization reactions (probably Michael addition of the amino groups) and therefore a non-reproducible increase in the viscosity of the coating agents occur under certain circumstances. This effect does not arise when azidosilanes are used as adhesion promoters.

We claim:
1. Liquid, beam-curable coating composition for coating glass surfaces, comprising
   A) 56 to 89% by weight, based on the coating composition, of at least one ethylenically unsaturated polyurethane,
   B) 10 to 30% by weight, based on the coating composition, of at least one ethylenically unsaturated monomer,
   C) 0.5 to 8% by weight, based on the coating composition, of at least one photoinitiator and
   D) 0.05 to 6% by weight, based on the coating composition, of a silane,
   the sum of components (A) to (D) in each case being 100% by weight,
   characterized in that it comprises, as component (D),
   $d_1$) at least one azidosilane of the general formula (I)

$$N_3-R^3-Si-R^1{}_n(OR^2)_{3-n} \qquad (I)$$

wherein $R^1$ represents a group selected from the group consisting of $C_1$–$C_3$-alkyl, phenyl, benzyl and toluyl groups, $R^2$ represents a group selected from the group consisting of a $C_1$–$C_4$-alkyl, $C_2$–$C_4$-alkoxyalkyl, phenyl and benzyl groups, $R^3$ represents a $C_1$–$C_8$-alkylene group, which can be interrupted by an oxygen atom or sulfur atom or a —(N—$R^4$)-group, wherein $R^4$ denotes a group selected from the group consisting of hydrogen, methyl, ethyl and phenyl groups, and n represents 0, 1 or 2.

2. Coating composition according to claim 1, characterized in that it comprises, as component ($d_1$), azidosilanes of the formula (I) in which $R_2$ represents a $C_1$–$C_4$-alkyl group, $R^3$ represents a $C_1$–$C_6$-alkylene group and n is 0.

3. Coating composition according to claim 1, characterized in that it comprises 3-azidopropyltriethoxysilane as component ($d_1$).

4. The coating composition of claim 1, wherein the unsaturated polyurethane contains urea groups.

5. Coating composition according to claim 1, characterized in that the monomer (B) is selected from the group consisting of N-vinylpyrrolidone, phenoxyethyl acrylate, isobornyl acrylate and mixtures thereof.

6. Coating composition according to claim 1, further comprising at least one additive.

7. Coating composition according to claim 1, further comprising $d_2$) at least one aminoalkoxysilane of the general formula (II)

$$H_2N-R^5-Si-R^6{}_m(OR^7)_{3-m} \qquad (II)$$

wherein $R^5$ represents a group selected from the group consisting of $C_1$–$C_6$-alkylene, $C_5$–$C_6$-cycloalkylene, and -arylene groups, which can additionally be substituted by one or two $C_1$–$C_3$-alkyl groups, and $R^6$ and $R^7$ independently of one another represent a $C_1$–$C_6$-alkyl or a $C_5$–$C_6$-cycloalkyl group, which can likewise additionally be substituted by one or two $C_1$–$C_3$-alkyl groups, and m can be 0, 1 or 2.

8. Coating composition according to claim 7, characterized in that it comprises, as component ($d_2$), a compound selected from the group consisting of N-aminoethyl-aminopropyltri-methoxysilane, aminopropyltrimethoxysilane, N-methyl-aminopropyltrimethoxysilane, triamino-modified propyltrimethoxysilane and mixtures thereof.

9. Coating composition according to claim 7, characterized in that it comprises, as component ($d_1$), azidosilanes of the formula (I) in which $R_2$ represents a $C_1$–$C_4$-alkyl group, $R^3$ represents a $C_1$–$C_6$-alkylene group and n is 0.

10. Coating composition according to claim 7, characterized in that it comprises 3-azidopropyltriethoxysilane as component ($d_1$).

11. Coating composition according to claim 7, wherein the ethylenically unsaturated polyurethane (A) includes urea groups.

12. Coating composition according to claim 7, characterized in that the monomer (B) is selected from the group consisting of N-vinylpyrrolidone, phenoxyethyl acrylate, isobornyl acrylate and mixtures thereof.

13. Coating composition according to claims 1 or 7, characterized in that it comprises 1.2 to 2.2% by weight, based on the total weight of the coating composition, of component (D).

14. An optical glass fiber coating composition comprising the beam-curable coating composition according to one of claims 1 or 7.

15. Process for coating a glass surface, comprising the steps of

I) applying a beam-curable coating composition and

II) curing the coating composition by means of UV radiation or electron beams, characterized in that a coating composition according to claim 1 or claim 7 is applied.

16. Process according to claim 15, characterized in that the glass surface is the surface of an optical glass fiber.

17. Optical glass fiber, characterized in that it is coated with a coating composition according to claim 1 or 7.

18. A light wave conductor comprising the coated optical glass fibers according to claim 17.

* * * * *